(12) United States Patent
Wang et al.

(10) Patent No.: US 10,031,627 B2
(45) Date of Patent: Jul. 24, 2018

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Bejing (CN)

(72) Inventors: Haisheng Wang, Beijing (CN); Xue Dong, Beijing (CN); Hailin Xue, Beijing (CN); Yingming Liu, Beijing (CN); Weijie Zhao, Beijing (CN); Xiaoliang Ding, Beijing (CN); Shengji Yang, Beijing (CN); Hongjuan Liu, Beijing (CN); Lei Wang, Beijing (CN); Chunlei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 386 days.

(21) Appl. No.: 14/648,090

(22) PCT Filed: Sep. 20, 2014

(86) PCT No.: PCT/CN2014/087004
§ 371 (c)(1),
(2) Date: May 28, 2015

(87) PCT Pub. No.: WO2015/180313
PCT Pub. Date: Dec. 3, 2015

(65) Prior Publication Data
US 2016/0306454 A1 Oct. 20, 2016

(30) Foreign Application Priority Data
May 30, 2014 (CN) .......................... 2014 1 0240493

(51) Int. Cl.
*G06F 3/045* (2006.01)
*G06F 3/044* (2006.01)
(Continued)

(52) U.S. Cl.
CPC ............ *G06F 3/044* (2013.01); *G02F 1/1333* (2013.01); *G06F 3/047* (2013.01); *G06F 3/0412* (2013.01); *G06F 2203/04103* (2013.01)

(58) Field of Classification Search
CPC ........ G06F 3/0412; G06F 3/044; G06F 3/047; G06F 2203/04103; G02F 1/1333; G02F 1/136286
See application file for complete search history.

(56) References Cited

U.S. PATENT DOCUMENTS

2006/0028591 A1* 2/2006 Kim .................. G02F 1/133512
349/38
2006/0176285 A1* 8/2006 Lee ..................... G02F 1/13338
345/173
(Continued)

FOREIGN PATENT DOCUMENTS

CN 102200872 A 9/2011
CN 102841716 A 12/2012
(Continued)

OTHER PUBLICATIONS

International Search Report and Written Opinion dated Mar. 6, 2015; PCT/CN2014/087004.
(Continued)

Primary Examiner — Amare Mengistu
Assistant Examiner — Crystal A Mathews
(74) Attorney, Agent, or Firm — Ladas & Parry LLP

(57) ABSTRACT

An in-cell touch panel and a display device are provided. Self-capacitance electrodes arranged in the same layer as pixel electrodes are disposed at gaps between the pixel
(Continued)

electrodes of the touch panel in accordance with the self-capacitance principle. A touch detection chip can determine a touch position by detection of capacitance variation of the self-capacitance electrodes in a touch period. The touch panel does not need to add additional processes on the basis of the manufacturing process of an array substrate and hence can reduce the manufacturing cost and improve the productivity.

16 Claims, 7 Drawing Sheets

(51) Int. Cl.
*G02F 1/1333* (2006.01)
*G06F 3/041* (2006.01)
*G06F 3/047* (2006.01)

(56) References Cited

U.S. PATENT DOCUMENTS

| | | | | |
|---|---|---|---|---|
| 2007/0170504 A1* | 7/2007 | Chang | ............... | H01L 27/124 257/347 |
| 2012/0212401 A1* | 8/2012 | Bae | ............... | G09G 3/3648 345/88 |
| 2012/0218199 A1* | 8/2012 | Kim | ............... | G06F 3/0412 345/173 |
| 2012/0249444 A1* | 10/2012 | Lee | ............... | G06F 3/0412 345/173 |
| 2012/0274603 A1* | 11/2012 | Kim | ............... | G06F 3/0412 345/174 |
| 2013/0106765 A1* | 5/2013 | Beecher | ............... | G06F 3/044 345/174 |
| 2013/0249820 A1* | 9/2013 | Woo | ............... | G06F 3/041 345/173 |
| 2013/0257794 A1* | 10/2013 | Lee | ............... | G06F 3/041 345/174 |
| 2013/0278513 A1* | 10/2013 | Jang | ............... | G06F 3/044 345/173 |
| 2013/0278538 A1* | 10/2013 | Brunet | ............... | G06F 3/044 345/174 |
| 2013/0314371 A1* | 11/2013 | Lee | ............... | G06F 3/0412 345/174 |
| 2014/0055685 A1 | 2/2014 | Wang et al. | | |
| 2014/0111466 A1 | 4/2014 | Kim et al. | | |
| 2014/0111710 A1 | 4/2014 | Yang et al. | | |
| 2014/0125626 A1 | 5/2014 | Yang et al. | | |
| 2014/0132560 A1 | 5/2014 | Huang et al. | | |
| 2014/0327846 A1* | 11/2014 | Hata | ............... | G06F 3/041 349/12 |
| 2014/0353691 A1* | 12/2014 | Lee | ............... | H01L 27/323 257/88 |
| 2014/0362031 A1* | 12/2014 | Mo | ............... | G09G 3/36 345/174 |
| 2015/0002421 A1* | 1/2015 | Kim | ............... | G06F 3/041 345/173 |
| 2015/0042599 A1* | 2/2015 | Lukanc | ............... | G06F 3/0412 345/174 |
| 2015/0116259 A1* | 4/2015 | Chen | ............... | G06F 3/0416 345/174 |
| 2015/0185902 A1* | 7/2015 | Liu | ............... | G06F 3/044 345/174 |
| 2015/0192814 A1 | 7/2015 | Kosugi et al. | | |
| 2015/0206501 A1* | 7/2015 | Kurasawa | ............... | G09G 3/2092 345/206 |
| 2015/0226871 A1* | 8/2015 | Ludden | ............... | G01V 3/08 324/676 |
| 2015/0268774 A1* | 9/2015 | Xu | ............... | G02F 1/13338 345/173 |
| 2015/0277655 A1* | 10/2015 | Kim | ............... | G06F 3/0412 345/174 |
| 2015/0338976 A1* | 11/2015 | Yang | ............... | G06F 3/0412 345/173 |
| 2016/0018922 A1 | 1/2016 | Wang et al. | | |
| 2016/0048267 A1* | 2/2016 | Lee | ............... | G06F 3/0418 345/173 |
| 2016/0306454 A1* | 10/2016 | Wang | ............... | G06F 3/0412 |
| 2017/0038876 A1* | 2/2017 | Yang | ............... | G06F 3/0412 |
| 2017/0090644 A1* | 3/2017 | Yao | ............... | G06F 3/0416 |

FOREIGN PATENT DOCUMENTS

| | | |
|---|---|---|
| CN | 102937852 | 2/2013 |
| CN | 102937853 A | 2/2013 |
| CN | 102955637 A | 3/2013 |
| CN | 103135830 A | 6/2013 |
| CN | 103793120 A | 5/2014 |
| CN | 104020910 A | 9/2014 |
| JP | 2014099159 A | 5/2014 |
| WO | 2014/045601 A1 | 3/2014 |

OTHER PUBLICATIONS

First Chinese Office Action dated Jun. 23, 2016; Appln. No. 201410240493.6.
Second Chinese Office Action dated Nov. 28, 2016; Appln. No. 201410240493.6.
Third Chinese Office Action dated Apr. 12, 2017; Appln. No. 201410240493.6.
The Extended European Search Report dated Jan. 2, 2018; Appln. No. 14863070.0.

* cited by examiner

IN-CELL TOUCH PANEL AND DISPLAY DEVICE

TECHNICAL FIELD

Embodiments of the present invention relate to an in-cell touch panel and a display device.

BACKGROUND

With the rapid development of display technology, touch screen panels have been gradually widespread in people's lives. Currently, in view of the structures, the touch screen panels can be divided into: add-on mode touch panels, on-cell touch panels and in-cell touch panels. The add-on mode touch panel needs to separately produce a touch screen and a liquid crystal display (LCD) which are hence bonded together to form an LCD with touch function. The add-on mode touch panel has the defects of high manufacturing cost, low light transmittance and thick modules. The in-cell touch panel allows touch electrodes of a touch screen to be embedded into an LCD, not only can reduce the overall thickness of modules but also can greatly reduce the manufacturing cost of the touch panel, and is favored by the major panel manufacturers.

Currently, the in-cell touch panel detects a finger touch position in accordance with the mutual-capacitance or self-capacitance principle. A plurality of self-capacitance electrodes arranged in the same layer and insulated from each other are disposed in the touch panel in accordance with the self-capacitance principle. When a human body does not touch the screen, the capacitance of the self-capacitance electrode is a fixed value. When a human body touches the screen, the capacitance of corresponding self-capacitance electrode is at a value of a fixed value plus the body capacitance. A touch detection chip can determine the touch position by the detection of the capacitance variation of the self-capacitance electrode in a touch period. As the body capacitance can act on the entire self-capacitance, compared with the case that the body capacitance can only act on the projected capacitance in mutual capacitance, the touch variation caused by the fact that the human body touches the screen will be greater than that of a touch panel produced in accordance with the mutual-capacitance principle. Compared with a mutual-capacitance touch panel, a self-capacitance touch panel can effectively improve the signal-to-noise ratio of touch and hence improve the accuracy of touch sensing.

In the structural design of the capacitive in-cell touch panel, extra layers must be added in a display panel to form corresponding electrodes and the like, so that new processes must be added in the process of manufacturing the panel. Therefore, the manufacturing cost can be increased and the productivity cannot be effectively improved.

SUMMARY

At least one embodiment of the present invention provides an in-cell touch panel and a display device which can reduce the manufacturing cost of the in-cell touch panel and improve the productivity.

At least one embodiment of the present invention provides an in-cell touch panel, which comprises a first substrate and a second substrate arranged opposite to each other, a pixel electrode layer disposed on one side of the second substrate facing the first substrate, and a touch detection chip, wherein the pixel electrode layer includes a plurality of pixel electrodes and self-capacitance electrodes insulated from each other; the pixel electrodes are arranged in an array; and a pattern of each self-capacitance electrode is disposed at a gap between two adjacent pixel electrodes.

At least one embodiment of the present invention provides a display device, which comprises the foregoing in-cell touch panel.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Thickness and the shape of layers in the accompanying drawings do not reflect the real scale and are only intended to illustrate the content of the present invention.

Figure 1:
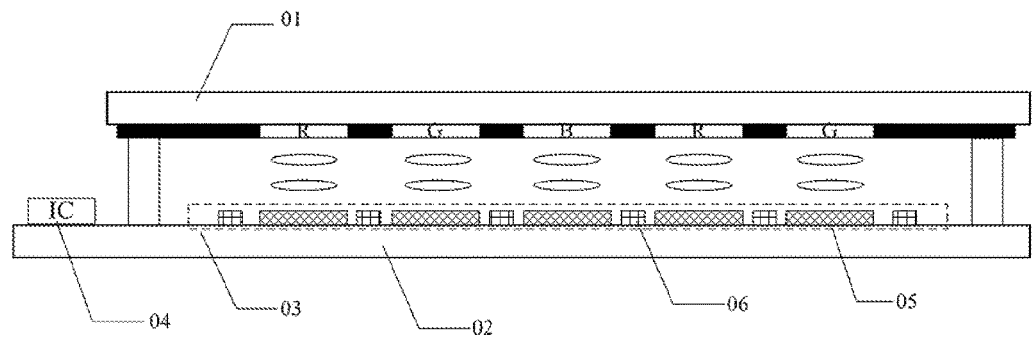
FIG. 1 is a schematic structural view of an in-cell touch panel provided by an embodiment of the present invention.

At least one embodiment of the present invention provides an in-cell touch panel which, as illustrated in FIG. 1, comprises: a first substrate 01 and a second substrate 02 arranged opposite to each other, a pixel electrode layer 03 disposed on one side of the second substrate 02, which side faces the first substrate 01, and a touch detection chip (IC) 04.

Figure 2:
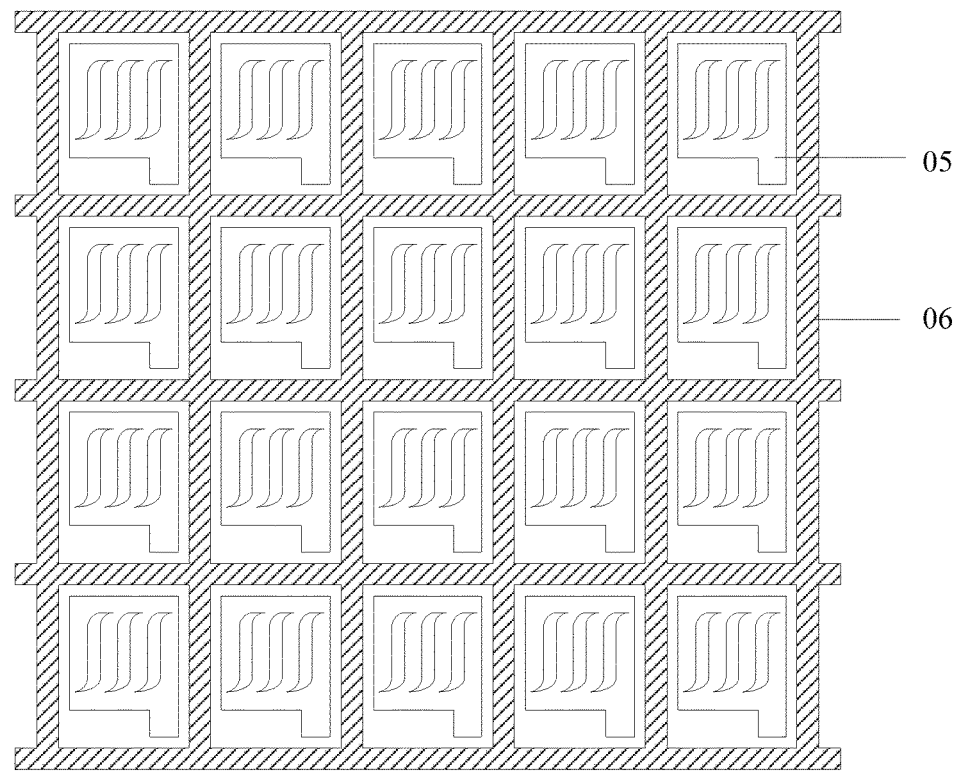
FIG. 2 is a schematic top view 1 of the in-cell touch panel provided by an embodiment of the present invention.

As illustrated in FIG. 2, the pixel electrode layer 03 includes a plurality of pixel electrodes 05 and self-capacitance electrodes 06 insulated from each other; the pixel electrodes 05 are arranged in arrays; and a pattern of each self-capacitance electrode 06 is disposed at a gap between two adjacent pixel electrodes 05.

The touch detection chip 04 is configured to determine the touch position by the detection of the capacitance variation of the self-capacitance electrode 06 in the touch period. As illustrated in FIG. 1, the touch detection chip 04 is disposed on the second substrate 02. But the present invention is not limited thereto. The touch detection chip 04 may also be disposed on the first substrate 01 or connected to the second substrate 02 through a flexible circuit board, etc.

In the in-cell touch panel provided by an embodiment of the present invention, the self-capacitance electrodes 06 arranged in the same layer as the pixel electrodes 05 are disposed at the gaps between the pixel electrodes 05 of the touch panel; and the touch detection chip 04 can determine the touch position by the detection of the capacitance variation of the self-capacitance electrodes 06 in the touch period. In the touch panel provided by an embodiment of the present invention, the structure of the pixel electrode layer is designed to form the self-capacitance electrodes at the gaps between the pixel electrodes. Therefore, the in-cell touch panel provided by the embodiment of the present invention does not need to add additional processes on the basis of the traditional process for manufacturing an array substrate and hence can reduce the manufacturing cost and improve the productivity.

For instance, in the touch panel provided by an embodiment of the present invention, the self-capacitance electrodes 06 are disposed at the gaps between the pixel electrodes 05. In order to reduce the mutual interference between display signals and touch signals, the time-sharing drive mode in touch periods and in display periods can be adopted during the implementation. In one preferred embodiment, a display drive chip and a touch detection chip may also be integrated into one chip, so that the manufacturing cost can be further reduced.

Figure 3A:
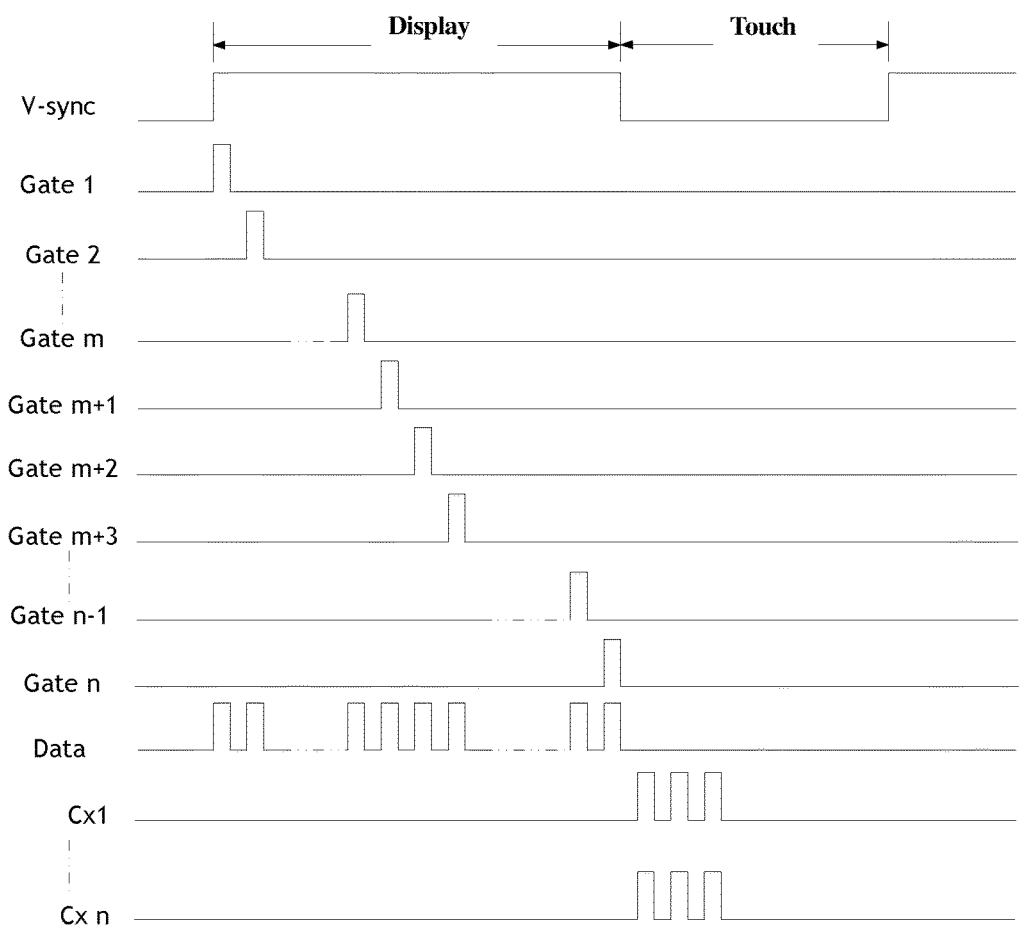
FIGS. 3a and 3b are respectively a drive timing sequence diagram of an in-cell touch panel provided by an embodiment of the present invention.
Figure 3B:
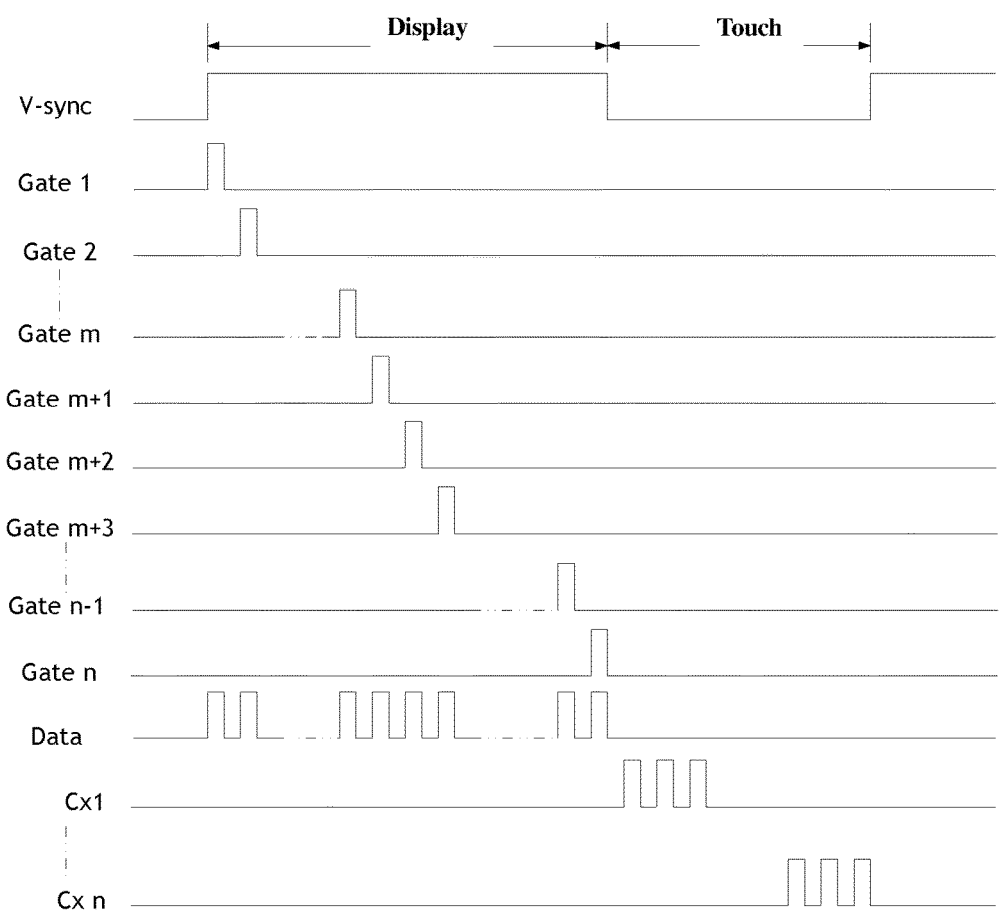

For instance, in the drive timing sequence diagram as shown in FIGS. 3a and 3b, the time of the touch panel for displaying each frame (V-sync) is divided into a display period (Display) and a touch period (Touch). For instance, in the drive timing sequence diagram as shown in FIGS. 3a and 3b, the time of the touch panel for displaying one frame is 16.7 ms, in which 5 ms is selected as the touch period and the remaining 11.7 ms is taken as the display period. Of course, the duration of the touch period and the display period may also be appropriately adjusted according to the processing capability of the IC. No specific limitation will be given here. In the display period (Display), a gate scanning signal is applied to each gate signal line Gate 1, Gate 2 . . . Gate n in the touch panel in sequence, and gray-scale signals are applied to data signal lines Data to achieve the function of liquid crystal display. In the touch panel (Touch), as illustrated in FIG. 3a, the touch detection chip connected with the self-capacitance electrodes Cx 1 . . . Cx n is configured to apply drive signals to the self-capacitance electrodes Cx 1 . . . Cx n simultaneously and receive feedback signals of the self-capacitance electrodes Cx 1 . . . Cx n simultaneously; or as illustrated in FIG. 3b, the touch detection chip connected with the self-capacitance electrodes Cx 1 . . . Cx n is configured to apply drive signals to the self-capacitance electrodes Cx 1 . . . Cx n sequentially and receive feedback signals of the self-capacitance electrodes Cx 1 . . . Cx n respectively. No limitation will be given here. Whether touch occurs is determined by means of the analysis of the feedback signals, so that the touch function can be achieved.

In general, the resolution of the touch panel is usually in millimeter level. Therefore, the density and the occupied area of the self-capacitance electrode 06 may be selected according to the required touch resolution so as to ensure the required touch resolution. Generally, the self-capacitance electrode 06 is designed to be a square electrode with the size of about 5 mm*5 mm and, of course, may also be in other shapes. The resolution of a display is usually in micro level. Therefore, generally, one self-capacitance electrode 06 will correspond to a plurality of pixel units in the display. Moreover, the patterns of the self-capacitance electrodes 06 are disposed at the gaps between the pixel electrodes. In this case, as illustrated in FIG. 2, the pattern of the self-capacitance electrode 06 is generally of a mesh structure including a plurality of mesh holes. The mesh holes of the mesh structure correspond to the pixel electrodes. FIG. 2 illustrates the pattern of one self-capacitance electrode 06.

Figure 4:
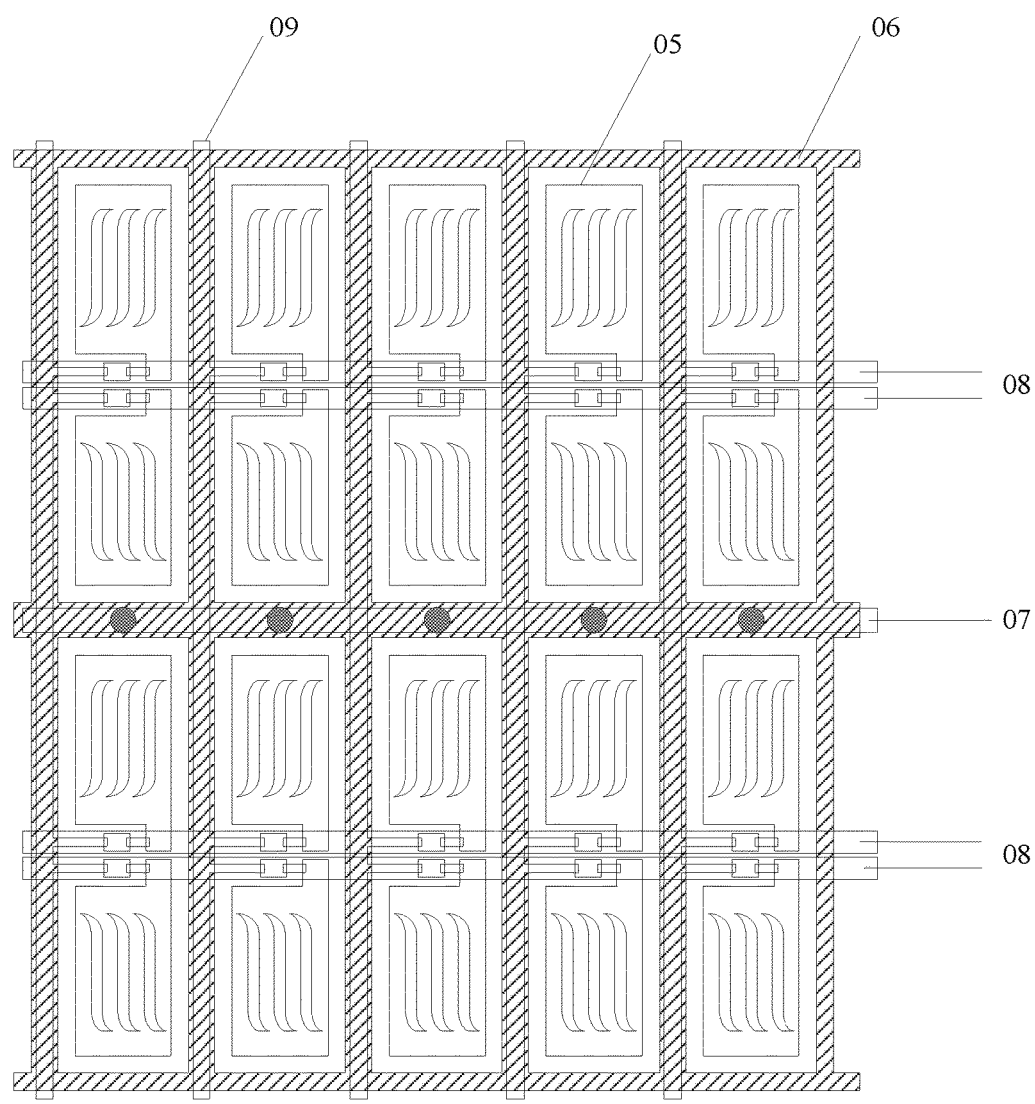
FIGS. 4 and 5 are respectively a schematic top view 2 of the in-cell touch panel provided by an embodiment of the present invention.
Figure 5:
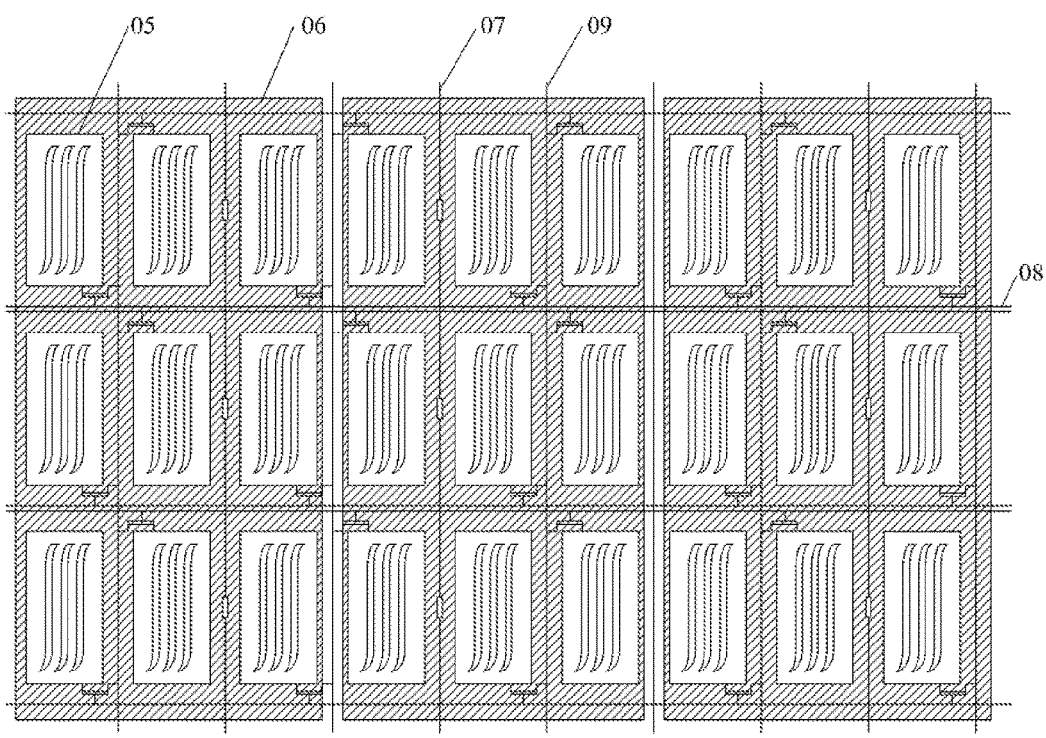

When the touch panel is designed by utilization of the self-capacitance principle, as illustrated in FIGS. 4 and 5, generally, each self-capacitance electrode 06 may be connected with the touch detection chip 04 through an independent lead 07. Thus, generally, the touch panel further comprises a plurality of leads 07 configured to connect the self-capacitance electrodes 06 to the touch detection chip 04.

For instance, patterns of the leads 07 and the self-capacitance electrodes 06 may be arranged in the same layer, namely may be formed at the same time along with patterns of the pixel electrodes; and the patterns of the leads 07 and the self-capacitance electrodes 06 may also be arranged in different layers, namely the patterns of the leads 07 are formed by a different patterning process.

Although an extra patterning process is not required to be added in the case that the leads 07 and the self-capacitance electrodes 06 are arranged in the same layer, a touch dead area will be formed. All the leads 07 connected with a plurality of self-capacitance electrodes 06 in the touch dead area run through the touch dead area. Therefore, the signals in the touch dead area are relatively disordered. That is to say, the touch performance in the area cannot be guaranteed. In view of this, preferably, the leads 07 and the self-capacitance electrodes 06 are generally arranged in different layers.

Moreover, no matter the leads 07 and the self-capacitance electrodes 06 are arranged in different layers or the same layer, for the patterns of the leads 07 to not affect the normal display operation, the patterns of the leads 07 are generally disposed at non-opening areas of pixel units. For instance, an orthographic projection of the pattern of the lead 07 on the second substrate 02 is disposed at a gap between two adjacent pixel electrodes 05.

As illustrated in FIGS. 4 and 5, the touch panel provided by at least one embodiment of the present invention may further comprise: gate signal lines 08 and data signal lines 09 which intersect each other and are disposed on one side of the second substrate 02 facing the first substrate 01. The gate signal lines 08 and the data signal lines 09 are disposed in an array structure which may further include thin-film transistors (TFTs) applied in sub-pixel units and functioning as switching elements. The TFT controls the charge and discharge of a corresponding pixel electrode.

In order to connect the self-capacitance electrodes 06 and the touch detection chip 04 through the leads 07, the extension direction of the leads is generally set to be the same as that of the gate signal lines 08 or that of the data signal lines 09. That is to say, the extension direction of the leads 07 is generally consistent to each other.

In the touch panel provided by at least one embodiment of the present invention, in order to not add an extra layer and ensure the productivity and reduce the manufacturing cost, for instance, the leads 07 connected with the self-capacitance electrodes 06 may be arranged in the same layer as the gate signal lines 08 or the data signal lines 09.

For instance, as illustrated in FIG. 4, on the second substrate 02, every two adjacent rows of pixel electrodes 05 are taken as a pixel group; and two gate signal lines 08 are disposed between the two adjacent rows of pixel electrodes 05 of one pixel group and configured to provide gate scanning signals for the two rows of pixel electrodes 05 respectively. The position of the gate signal lines 08 originally between adjacent pixel groups can be saved by changing the position of the gate signal lines 08 between the two adjacent rows of pixel electrodes and TFT switches. In this case, as illustrated in FIG. 4, the leads 07 may be disposed at gaps between adjacent pixel groups and are arranged in the same layer as the gate signal lines 08. The leads 07 are electrically connected with corresponding self-capacitance electrodes 06 via through holes.

For instance, as illustrated in FIG. 5, the array substrate adopts a dual gate structure; on the second substrate 02, two gate signal lines 08 are disposed between adjacent rows of pixel electrodes 05; every two adjacent columns of pixel electrodes 05 (namely sub-pixel units) are set to be a pixel group; and two columns of pixel electrodes in one pixel group share a data signal line 09 disposed between the two adjacent columns of pixel electrodes 05. The position of the data signal lines 09 originally between adjacent pixel groups can be saved by doubling the number of the gate signal lines 08. In this case, as illustrated in FIG. 5, the leads 07 may be disposed at gaps between adjacent pixel groups and are arranged in the same layer as the data signal lines. The leads 07 are electrically connected with corresponding self-capacitance electrodes 06 via through holes.

Figure 6:
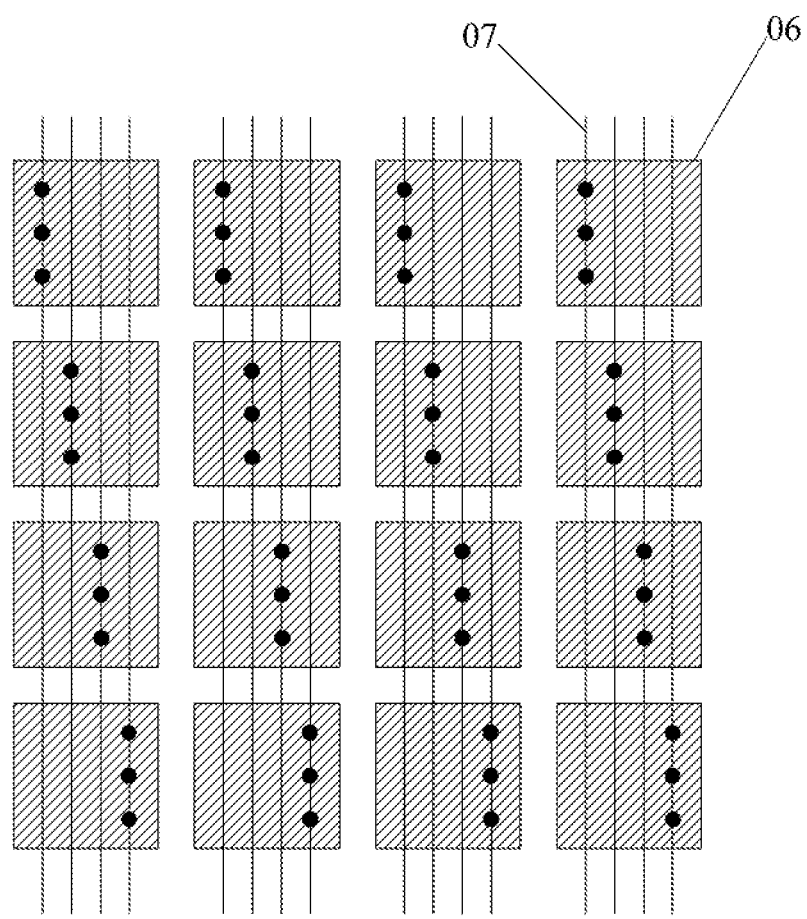
FIGS. 6 and 7 are respectively a schematic top view 3 of the in-cell touch panel provided by an embodiment of the present invention.

As the pixel electrode layer is usually made from an ITO material and the resistance of the ITO material is relatively high, in order to maximally reduce the resistance of the pixel electrode layer and improve the signal-to-noise ratio of electrical signal transmission of the self-capacitance electrodes 06, the self-capacitance electrodes 06 and corresponding leads 07 may be electrically connected with each other via a plurality of through holes, as shown in FIG. 6, which is equivalent to connect ITO electrodes and a plurality of metal resistors formed by the leads in parallel. Therefore, the overall resistance of the electrodes can be significantly reduced, and hence the signal-to-noise ratio of the electrodes during the signal transmission can be improved.

Figure 7:
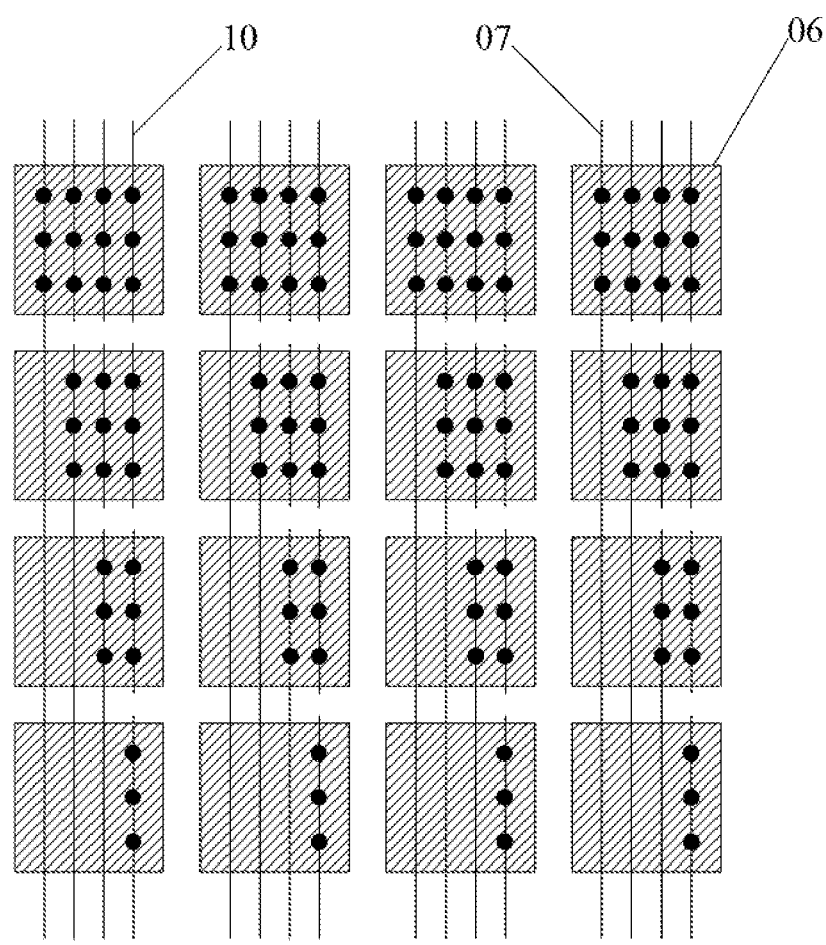

Moreover, in order to further reduce the overall resistance of the self-capacitance electrodes 06, when the leads 07 are designed, as illustrated in FIG. 7, if the leads 07 are electrically connected with corresponding self-capacitance electrodes 06, the entire lead originally running through the entire panel may be disconnected to form the leads 07 and a plurality of metal wires 10 arranged in the same layer as and insulated from the leads 07; and the metal wire 10 and the lead 07 are disposed in the same straight line while connected in parallel with an overlapped self-capacitance electrode 06, namely electrically connected with each other via through holes. The above design can fully utilize the gaps between adjacent groups of pixel units, ensures the aperture ratio of the touch panel, and meanwhile, utilizes the redundant portions of the leads to arrange the metal wires with low resistance, allows the metal wires with low resistance to be connected in parallel with the self-capacitance electrodes with high resistance, and hence can significantly reduce the resistance of the self-capacitance electrodes.

The in-cell touch panel provided by at least one embodiment of the present invention not only is applicable to twisted nematic (TN) LCDs but also is applicable to advanced dimension switch (ADS) LCDs and in-plane switch (IPS) LCDs.

For instance, on a second substrate of an ADS LCD, a common electrode layer, as a plate electrode, is disposed on the lower layer (closer to a base substrate) and pixel electrodes, taken as slit electrodes, are disposed on the upper layer (closer to a liquid crystal layer), namely an insulating layer is disposed between the pixel electrodes and the common electrode. But on an array substrate of an HADS LCD panel, a pixel electrode, as a plate electrode, is disposed on the lower layer (closer to a base substrate), and a common electrode, as a slit electrode, is disposed on the upper layer (closer to a liquid crystal layer), namely an insulating layer is disposed between the pixel electrode and the common electrode.

According to the mode of the LCD panel specifically applied by the touch panel, the pixel electrodes 05 and the self-capacitance electrodes 06 arranged in the same layer may be disposed above or below the common electrode(s). No limitation will be given here. Moreover, in order to increase the variation caused by the fact that the self-capacitance electrodes 06 senses the body capacitance in the touch period, the self-capacitance electrodes 06 and the pixel electrodes 05 are generally disposed above the common electrode(s) on the second substrate 02, namely the self-capacitance electrodes 06 are close to the first substrate 01 as much as possible in the ADS mode.

Any known patterning flow may be adopted to form layers on the second substrate 02, for instance, eight (8) patterning processes may be adopted, i.e., patterning of gate electrodes and gate lines, patterning of active layers, patterning of a first insulating layer, patterning of data lines and source/drain electrodes, patterning of a resin layer, patterning of common electrodes, patterning of a second insulating layer, and patterning of a pixel electrode layer. Moreover, 7, 6 or 5 patterning processes may also be adopted according to actual design. No limitation will be given here.

At least one embodiment of the present invention further provides a display device, which comprises the in-cell touch panel provided by at least one embodiment of the present invention. The display device may be: any product or component with display function such as a mobile phone, a tablet PC, a TV, a display, a notebook computer, a digital picture frame and a navigator. The embodiments of the display device may involve the embodiments of the in-cell touch panel. No further description will be given here.

In the in-cell touch panel and the display device, provided by at least one embodiment of the present invention, the self-capacitance electrodes arranged in the same layer as the pixel electrodes are disposed at the gaps between the pixel electrodes of the touch panel in accordance with the self-capacitance principle; and the touch detection chip can determine the touch position by the detection of the capacitance variation of the self-capacitance electrodes in the touch period. In the touch panel provided by the embodiment of the present invention, as the structure of the pixel electrode layer is modified to form the self-capacitance electrodes at the original gaps of the pixel electrodes, no additional process is required to be added on the basis of the traditional manufacturing process of an array substrate. Therefore, the manufacturing cost can be reduced and the productivity can be improved.

The foregoing is only the preferred embodiments of the present invention and not intended to limit the scope of protection of the present invention. The scope of protection of the present invention should be defined by the appended claims.

The application claims priority to the Chinese patent application No. 201410240493.6, filed Aug. May 30, 2014, the entire disclosure of which is incorporated herein by reference as part of the application.

The invention claimed is:

1. An in-cell touch panel, comprising: a first substrate and a second substrate arranged opposite to each other, a pixel electrode layer disposed on one side of the second substrate facing the first substrate, and a touch detection chip, wherein
the pixel electrode layer includes a plurality of pixel electrodes and self-capacitance electrodes insulated from each other and disposed in a same layer; the pixel electrodes are arranged in an array; a pattern of each self-capacitance electrode is disposed at a gap between two adjacent pixel electrodes; and the touch detection chip is configured to determine a touch position by detection of capacitance variation of the self-capacitance electrodes in a touch period,
wherein the pattern of the self-capacitance electrode is a mesh structure including a plurality of mesh holes; and the plurality of pixel electrodes correspond to the plurality of mesh holes, and
the in-cell touch panel, further comprising: a plurality of leads configured to connect the self-capacitance electrodes to the touch detection chip.

2. The in-cell touch panel according to claim 1, wherein the leads and the self-capacitance electrodes are arranged in different layers.

3. The in-cell touch panel according to claim 2, wherein an orthographic projection of a pattern of the lead on the second substrate is disposed at a gap between two adjacent pixel electrodes.

4. The in-cell touch panel according to claim 3, further comprising: gate signal lines and data signal lines which intersect each other and are disposed on one side of the second substrate facing the first substrate, wherein
an extension direction of the leads is the same with that of the gate signal lines or the data signal lines.

5. The in-cell touch panel according to claim 4, wherein every two adjacent rows of pixel electrodes are taken as a pixel group; two gate signal lines are disposed between the two adjacent rows of pixel electrodes and configured to provide gate scanning signals for the two adjacent rows of pixel electrodes respectively; and
the leads are disposed at gaps between adjacent pixel groups and arranged in the same layer as the gate signal lines.

6. The in-cell touch panel according to claim 5, further comprising: a plurality of metal wires arranged in the same layer as and insulated from the leads, wherein
the metal wire and the lead are disposed in the same straight line and connected in parallel with an overlapped self-capacitance electrode.

7. The in-cell touch panel according to claim 4, wherein two gate signal lines are disposed between adjacent rows of pixel electrodes; every two adjacent columns of pixel electrodes are taken as a pixel group and share a data signal line disposed between the two adjacent columns of pixel electrodes; and
the leads are disposed at gaps between adjacent pixel groups and arranged in the same layer as the date signal lines.

8. The in-cell touch panel according to claim 7, further comprising: a plurality of metal wires arranged in the same layer as and insulated from the leads, wherein
the metal wire and the lead are disposed in the same straight line and connected in parallel with an overlapped self-capacitance electrode.

9. A display device, comprising an in-cell touch panel, the in-cell touch panel, comprising: a first substrate and a second substrate arranged opposite to each other, a pixel electrode layer disposed on one side of the second substrate facing the first substrate, and a touch detection chip, wherein
the pixel electrode layer includes a plurality of pixel electrodes and self capacitance electrodes insulated from each other and disposed in a same layer; the pixel electrodes are arranged in an array; a pattern of each self-capacitance electrode is disposed at a gap between two adjacent pixel electrodes; and the touch detection chip is configured to determine a touch position by detection of capacitance variation of the self-capacitance electrodes in a touch period,
wherein the pattern of the self-capacitance electrode is a mesh structure including a plurality of mesh holes; and the plurality of pixel electrodes correspond to the plurality of mesh holes, and
the in-cell touch panel, further comprising: a plurality of leads configured to connect the self-capacitance electrodes to the touch detection chip.

10. The in-cell touch panel according to claim 9, wherein the leads and the self-capacitance electrodes are arranged in different layers.

11. The in-cell touch panel according to claim 10, wherein an orthographic projection of a pattern of the lead on the second substrate is disposed at a gap between two adjacent pixel electrodes.

12. The in-cell touch panel according to claim 11, further comprising: gate signal lines and data signal lines which intersect each other and are disposed on one side of the second substrate facing the first substrate, wherein
an extension direction of the leads is the same with that of the gate signal lines or the data signal lines.

13. The in-cell touch panel according to claim 12, wherein every two adjacent rows of pixel electrodes are taken as a pixel group; two gate signal lines are disposed between the two adjacent rows of pixel electrodes and configured to provide gate scanning signals for the two adjacent rows of pixel electrodes respectively; and
the leads are disposed at gaps between adjacent pixel groups and arranged in the same layer as the gate signal lines.

14. The in-cell touch panel according to claim 13, further comprising: a plurality of metal wires arranged in the same layer as and insulated from the leads, wherein
the metal wire and the lead are disposed in the same straight line and connected in parallel with an overlapped self-capacitance electrode.

15. The in-cell touch panel according to claim 12, wherein two gate signal lines are disposed between adjacent rows of pixel electrodes; every two adjacent columns of pixel electrodes are taken as a pixel group and share a data signal line disposed between the two adjacent columns of pixel electrodes; and
the leads are disposed at gaps between adjacent pixel groups and arranged in the same layer as the date signal lines.

16. The in-cell touch panel according to claim 15, further comprising: a plurality of metal wires arranged in the same layer as and insulated from the leads, wherein
the metal wire and the lead are disposed in the same straight line and connected in parallel with an overlapped self-capacitance electrode.

* * * * *